US 10,241,933 B2

(12) United States Patent
Horsnell et al.

(10) Patent No.: US 10,241,933 B2
(45) Date of Patent: Mar. 26, 2019

(54) SUPPORT APPARATUS AND METHOD FOR PROCESSING DATA AND USING HARDWARE SUPPORT FOR ATOMIC MEMORY TRANSACTIONS

(71) Applicant: ARM LIMITED, Cambridge, Cambridgeshire (GB)

(72) Inventors: Matthew James Horsnell, Cambridge (GB); Richard Roy Grisenthwaite, Cambridge (GB); Stuart David Biles, Cambridge (GB)

(73) Assignee: ARM Limited, Cambridge (GB)

( * ) Notice: Subject to any disclaimer, the term of this patent is extended or adjusted under 35 U.S.C. 154(b) by 2 days.

(21) Appl. No.: 15/123,805

(22) PCT Filed: Mar. 4, 2015

(86) PCT No.: PCT/GB2015/050619
§ 371 (c)(1),
(2) Date: Sep. 6, 2016

(87) PCT Pub. No.: WO2015/132584
PCT Pub. Date: Sep. 11, 2015

(65) Prior Publication Data
US 2017/0017583 A1    Jan. 19, 2017

(30) Foreign Application Priority Data

Mar. 6, 2014    (GB) .................................. 1403948.1

(51) Int. Cl.
*G06F 12/14*    (2006.01)
*G06F 9/46*    (2006.01)

(52) U.S. Cl.
CPC .......... *G06F 12/1475* (2013.01); *G06F 9/467* (2013.01); *G06F 2212/1052* (2013.01)

(58) Field of Classification Search
CPC ................. G06F 12/1475; G06F 9/467; G06F 2212/1052
See application file for complete search history.

(56) References Cited

U.S. PATENT DOCUMENTS

| 5,442,755 A | 8/1995 | Shibata |
| 5,790,851 A * | 8/1998 | Frank ........................ G06F 9/52 718/100 |

(Continued)

FOREIGN PATENT DOCUMENTS

EP    0 567 355    10/1993

OTHER PUBLICATIONS

International Search Report and Written Opinion of the ISA for PCT/GB2015/050619, dated Jun. 26, 2015, 12 pages.

(Continued)

*Primary Examiner* — Larry T MacKall
(74) *Attorney, Agent, or Firm* — Nixon & Vanderhye P.C.

(57) ABSTRACT

An asymmetric multiprocessor system includes a plurality of processor cores supporting transactional memory via controllers as well as one or more processor cores which do not support transactional memory via hardware. The controllers respond to receipt of a request for exclusive access to a lock address by determining whether or not their associated processors is currently executing a memory transaction guarded by a lock value stored at that lock address and if their processor is executing such a transaction, then delaying releasing the lock address for exclusive access until a predetermined condition is met. If the processor is not executing such a guarded memory transaction, then the lock address may be unconditionally released for exclusive access. The predetermined condition may be that a threshold delay has been exceeded since the request was received and/or that the request has previously been received and refused a threshold number of times. The request may arise (Continued)

through execution of a transaction start instruction which serves to read a lock address from an architectural register storing the lock address should the processor executing that transaction start instruction not already be executing a pending memory transaction. If the processor is already executing a memory transaction, then the transaction start instruction need not access the lock value stored at the lock address held within the lock address register as it may be assumed that the lock value has already been checked.

20 Claims, 6 Drawing Sheets

(56) References Cited

U.S. PATENT DOCUMENTS

| | | | |
|---|---|---|---|
| 8,074,030 B1 | 12/2011 | Moir et al. | |
| 2002/0066051 A1* | 5/2002 | Hobson | G06F 9/466 714/16 |
| 2005/0086446 A1* | 4/2005 | McKenney | G06F 9/526 711/163 |
| 2007/0282838 A1 | 12/2007 | Shavit et al. | |
| 2009/0144524 A1* | 6/2009 | Shen | G06F 9/466 712/30 |
| 2010/0169623 A1 | 7/2010 | Dice | |
| 2011/0016470 A1* | 1/2011 | Cain, III | G06F 9/528 718/101 |
| 2014/0040554 A1 | 2/2014 | Pohlack et al. | |
| 2014/0059333 A1* | 2/2014 | Dixon | G06F 9/3004 712/244 |

OTHER PUBLICATIONS

Search Report for GB 1403948.1, dated Sep. 5, 2014, 4 pages.
Search Report for GB 1403948.1, dated Apr. 30, 2015, 2 pages.
Harris et al., "Revocable Locks for Non-Blocking Programming", Proceedings of the Tenth ACM Sigplan Symposium on Principles and Practice of Parallel Programming, Jun. 15, 2005, pp. 72-82.
Roy et al., "A Runtime System for Software Lock Elision", Computer Systems, EuroSys '09, Apr. 1-3 2009, pp. 261-274.
Smaragdalis et al. "General and Efficient Locking without Blocking", MSPC '08, Mar. 2, 2008, pp. 1-5.
Usui et al., "Adaptive Locks: Combining Transactions and Locks for Efficient Concurrency", Journal of Parallel and Distributed Computing, vol. 70, No. 10, Feb. 26, 2010, pp. 1009-1023.
Usui et al., "Adaptive Locks: Combining Transactions and Locks for Efficient Concurrency" 2009 18$^{th}$ International Conference on Parallel Architectures and Compilation Techniques, Sep. 12-16, 2009, pp. 3-14.
Rajwar et al., "Speculative lock elision: Enabling high concurrent multithreaded execution", MICRO-34, Proceedings of the 34$^{th}$ Annual ACM/IEEE International Symposium on Microarchitecture, Dec. 1, 2001, pp. 294-305.
Suleman et al, "Accelerating Critical Section Execution with Asymmetric Multi-Core Architectures", ASPLOS '09, Mar. 7-11, 2009, 12 pages.
Intel Architecture Instruction Set Extensions Programming Reference, Feb. 2012, 598 pages.
Harris et al., Transactional Memory, 2$^{nd}$ edition, Synthesis Lectures on Computer Architecture #11, Dec. 2010, 263 pages.
IBM, Power ISA, Version 2.07, Book II: Power ISA Virtual Environment Architecture, Chapter 5—Transactional Memory Facility, May 3, 2013, 23 pages.
Office Action dated Oct. 25, 2018 in EP Application No. 15709312.1, 5 pages.
Israeli Office Action dated Nov. 15, 2018 in IL Application No. 247423 and English translation, 9 pages.
Office Action dated Nov. 27, 2018 in JP Application No. 2016-554666 and English translation, 4 pages.

\* cited by examiner

SUPPORT APPARATUS AND METHOD FOR PROCESSING DATA AND USING HARDWARE SUPPORT FOR ATOMIC MEMORY TRANSACTIONS

This application is the U.S. national phase of International Application No. PCT/GB2015/050619 filed 4 Mar. 2015, which designated the U.S. and claims priority to GB Patent Application No. 1403948.1 filed 6 Mar. 2014, the entire contents of each of which are hereby incorporated by reference.

This disclosure relates to the field of data processing systems. More particularly, this disclosure relates to support for transactional memory within data processing systems having a plurality of processing elements which store shared data values within a memory.

It is known to provide data processing systems having a plurality of processing elements which share data values stored within a memory. In order to control consistency between the processing elements it is known to provide locks associated with regions of the memory address space such that when one of the processing elements wishes to perform an access to that region it first checks that a lock value associated with that region is not set. If the lock value is set, then this indicates that another processing element is already performing a transaction within that region and accordingly the current access should be aborted and retried at a later time. If the test reveals that the lock is not currently set, then processing element making the access request can set the lock value, perform its access and then reset the lock value.

While the use of locks provides a safe mechanism for sharing data values between processing elements, it can adversely impact performance as the locks may be set at a coarse level of granularity such that memory accesses which do not in fact impact the same data values within a locked region are prevented from running in parallel when in practice they could proceed in parallel without difficulty. Conversely, if the locks are made too fine-grained, then the level of overhead associated with storing and managing the locks becomes burdensome.

One way of addressing the above is to provide elision mechanisms. With such mechanisms a processing element can gain access to data values and speculatively perform a memory transaction upon a local copy of those data values which it holds. When performing such a memory transaction, the processing element notifies other processing elements within the system that it is performing memory accesses upon a given region of memory addresses. If any other processing element is currently performing a memory transaction involving any of the memory addresses within that region as part of its own speculative processing, then it aborts this speculative processing (memory transaction) such that the requester can obtain access to the memory region concerned and perform the more recent speculative operation.

It will be appreciated that the aborting of pending memory transactions raises the possibility of deadlock situations arising. Accordingly, mechanisms are provided to ensure a fall back path for execution to take place and forward progress to be made within the processing workload. This may be achieved by utilising the above described lock mechanism as the fall back path should contention arise between processing elements. The use of such lock mechanisms may reduce performance compared to management based upon speculative memory transactions which are aborted if contention arises, but it does provide a way of ensuring that deadlocks may be overcome. Accordingly, even when elision mechanisms are provided, processing elements upon commencing a memory transaction will check to see if the memory region concerned is locked even though they are not intending to lock that memory region themselves and will instead normally proceed based upon a speculative memory transaction. If the processing element finds the region is locked, then it will not proceed with the memory transaction and may retry it at a later time. In addition, a processing element will monitor the lock address which is guarding a memory region upon which it is performing speculative memory transactions and if this lock address is accessed by another processing element in a conflicting manner, then it will abort its speculative memory transactions. Thus, a processing element needing to make use of the lock is able to set the lock value without any need to wait for pending memory transactions to complete in a manner which could otherwise prevent the lock value being set and exclusive access to the region obtained.

Viewed from one aspect the present disclosure provides apparatus for processing data and including hardware support for atomic memory transactions, said apparatus comprising:
  a plurality of processing elements each configured to execute a sequence of program instructions; and a memory configured to store data values shared by said plurality of processing elements;
  wherein at least one of said plurality of processing elements is an transactional-memory-supporting processing element having a controller configured to monitor access to a lock address within said memory and said controller is configured to respond to a received request from another of said plurality of processing elements to obtain exclusive access to said lock address by:
    (i) when said transactional-memory-supporting processing element is executing a memory transaction guarded by said lock address, delaying releasing said lock address for exclusive access until a predetermined condition is met; and
    (ii) when said transactional-memory-supporting processing element is not executing a memory transaction guarded by said lock address, releasing said lock address for exclusive access independent of said predetermined condition.

The present disclosure recognises that while monitoring a lock address that is guarding a memory transaction being speculatively performed by one of the processing elements there are circumstances in which it is appropriate not to unconditionally respond to a request to obtain exclusive access to that lock address by immediately releasing that lock address for exclusive use by the requester. The simple approach of unconditionally releasing the lock address for exclusive access by the requester may be appropriate in homogeneous systems containing processing elements which are peers in terms of performance and priority, but a different approach may be adopted in other circumstances. The present disclosure provides that when the processing element is executing a memory transaction guarded by that lock address, then a predetermined condition must be met before the lock address is released for exclusive access by the requester. Conversely, when the processing element is not executing in a memory transaction guarded by the lock address for which the request is made, then the lock address is unconditionally released for exclusive access independent of the predetermined condition.

In some embodiments the controller may be configured to delay releasing the lock address by returning a request refuse response to the received request. In other embodiments the controller may be configured to delay releasing the lock address by delaying the return of any response to the received request.

One example form of the predetermined condition to be met before the lock address is released may be that the transaction-memory-supporting processing element has received a predetermined number of access requests to the lock address without releasing the lock address. Thus, the release will not be made until several requests have been made and refused.

Another example of the predetermined condition that must be met before the lock address is released may be that a predetermined time has passed since the request was received, i.e. the release is delayed for a predetermined period.

Waiting until the predetermined condition is met before releasing the lock address provides additional time for a pending memory transaction to complete before the lock address is released. When the lock address is released and the memory transaction guarded by that lock address has not completed, then the memory transaction may be aborted.

The present disclosure may be used in embodiments in which the plurality of processing elements include at least one transactional-memory-non-supporting processing element which does not have a controller for supporting the more advanced transaction memory techniques involving elision, cache snooping and the like. As an example, a system may include several complex, high performance processor cores together with one or more simple, low power processor cores. The high performance processor cores may include mechanisms for more sophisticated data value sharing and transactional memory support, whereas the simple low power cores may rely upon a transitional lock mechanism to ensure consistency. Within such systems, if the low power processor core seeks to access a memory region which is being used by the high performance processor cores, then it will normally force an immediate abort of the memory transactions on those high performance processor cores and degrade the performance of the overall system to the level of the low power processor core. However, using the present disclosure, the high performance processor cores may hold off releasing the lock address (permitting the lock value to be set) to the low power processor core until a predetermined condition is met thereby allowing a reduction in the degradation of the performance of the high performance processor cores to be reduced.

Such asymmetric multiprocessing apparatus are useful in providing systems which can cope with a wide variety of different processing workloads in an energy efficient manner.

In some embodiments, the predetermined conditions may be that the request is received from one of the processing elements which is a transactional-memory-supporting processing element (e.g. a high performance core) such that requests received from processing elements not matching this form are not acted upon at least for a time.

The overhead associated with executing program instructions which utilise an access to a lock address/value at the start of a memory transaction may be reduced in systems in which a lock address register dedicated to storing the lock address is provided within the architectural registers holding parameters specifying the configuration of a processor. Accordingly, when a transaction start instruction is decoded by an instruction decoder of that processing element, then this may be used to determine whether or not the processing element is already executing a memory transaction, and if the processing element is not already executing a memory transaction, then to read the lock from the lock address register and access the lock value stored at the lock address. Conversely, if the processing element is already executing a memory transaction, then the system may proceed with further processing following the transaction start instruction without the need to access the lock value stored at the lock address.

This feature recognises that program code will typically prefix the program instructions performing any memory transaction with a transaction start instruction so as at least to check if the lock value for the memory region concerned is set, e.g. by a processing element using the traditional lock mechanism. Within nested code this can result in redundant such checks and accesses being made as the processor already is performing a memory transaction and already has control of the lock address and yet a subsequent memory transaction will unnecessarily re-check the lock address value wasting time and energy. Furthermore, the overhead associated with providing the lock address via a software mechanism may be reduced by instead providing an architectural register which stores the lock address on a per process basis such that when a transaction start instruction is encountered a lookup of the lock address may be made to this fixed location within the architectural registers rather than to an instruction specified location.

Viewed from another aspect the present disclosure provides apparatus for processing data and including hardware support for atomic memory transactions, said apparatus comprising:

a plurality of processing means each for executing a sequence of program instructions; and memory means for storing data values shared by said plurality of processing means;

wherein at least one of said plurality of processing means is an transactional-memory-supporting processing means having control means for monitoring access to a lock address within said memory means and for responding to a received request from another of said plurality of processing means to obtain exclusive access to said lock address by:
  (i) when said transactional-memory-supporting processing means is executing a memory transaction guarded by said lock address, delaying releasing said lock address for exclusive access until a predetermined condition is met; and
  (ii) when said transactional-memory-supporting processing means is not executing a memory transaction guarded by said lock address, releasing said lock address for exclusive access independent of said predetermined condition.

Viewed from a further aspect the present disclosure provides a method of processing data using hardware support for atomic memory transactions, said method comprising the steps of:

executing a sequence of program instructions using a plurality of processing elements; and storing within a memory data values shared by said plurality of processing elements;

wherein at least one of said plurality of processing means is an transactional-memory-supporting processing element that monitors access to a lock address within said memory and responds to a received request from another of said plurality of processing elements to obtain exclusive access to said lock address by:
  (i) when said transactional-memory-supporting processing element is executing a memory transaction guarded by said lock address, delaying releasing said lock address for exclusive access until a predetermined condition is met; and (ii) when said transactional-memory-supporting processing element is not executing a memory transaction guarded by said lock address, releasing said lock address for exclusive access independent of said predetermined condition.

The provision of an architectural register serving as a place for storing a lock address within a lock address register dedicated to that purpose may be used separately from the mechanisms which serve to release a lock address in response to a request only when a predetermined condition is met if the lock address is guarding a memory transaction currently in progress. Accordingly, the present disclosure also provides apparatus for processing data and providing hardware support for atomic memory transactions, said apparatus comprising:

a plurality of processing elements each configured to execute a sequence of program instructions; and a memory configured to store data values shared by said plurality of processing elements; wherein at least a given one of said plurality of processing elements comprises:

one or more architectural registers configured to hold parameters specifying configuration of said at least one of said plurality of processing elements, said one or more architectural registers including a lock address register dedicated to storing a lock address serving to control exclusive access to a region of said memory; and instruction decoder circuitry configured to decode a transaction start instruction indicating starting of a memory transaction and:

(i) if said given one of said plurality of processing elements is not executing a memory transaction, then to generate one or more control signals to control reading of said lock address from said lock address register; and (ii) if said given one of said plurality of processing elements is already executing a memory transaction, then proceeding with further processing without reading said lock address from said lock address register.

Viewed from a further aspect the present disclosure provides apparatus for processing data and providing hardware support for atomic memory transactions, said apparatus comprising:

a plurality of processing means each for executing a sequence of program instructions; and a memory for storing data values shared by said plurality of processing means; wherein at least a given one of said plurality of processing means comprises:

one or more architectural register means for holding parameters specifying configuration of said at least one of said plurality of processing means, said one or more architectural register means including lock address register means dedicated to storing a lock address serving to control exclusive access to a region of said memory means; and instruction decoder means for decoding a transaction start instruction indicating starting of a memory transaction and:

(i) if said given one of said plurality of processing means is not executing a memory transaction, then to generate one or more control signals to control reading of said lock address from said lock address register means; and (ii) if said given one of said plurality of processing means is already executing a memory transaction, then proceeding with further processing without reading said lock address from said back address register.

Viewed from a further aspect the present disclosure provides a method of processing data using hardware support for atomic memory transactions, said method comprising the steps of:

executing a sequence of program instructions using a plurality of processing elements; and storing within a memory data values shared by said plurality of processing elements; wherein a given one of said plurality of processing elements performs the steps of:

holding within one or more architectural registers parameters specifying configuration of said at least one of said plurality of processing elements, said one or more architectural registers including a lock address register dedicated to storing a lock address serving to control exclusive access to a region of said memory; and decoding a transaction start instruction indicating starting of a memory transaction and:

(i) if said given one of said plurality of processing elements is not executing a memory transaction, then generating one or more control signals to control reading of said lock address from said lock address register; and (ii) if said given one of said plurality of processing elements is already executing a memory transaction, then proceeding with further processing without reading said lock address from said lock address register.

Embodiments of the invention will now be described, by way of example only, with reference to the accompanying drawings in which:

FIG. 1 schematically illustrates a data processing apparatus including a plurality of processing elements sharing data values within a memory;

Figure 1:
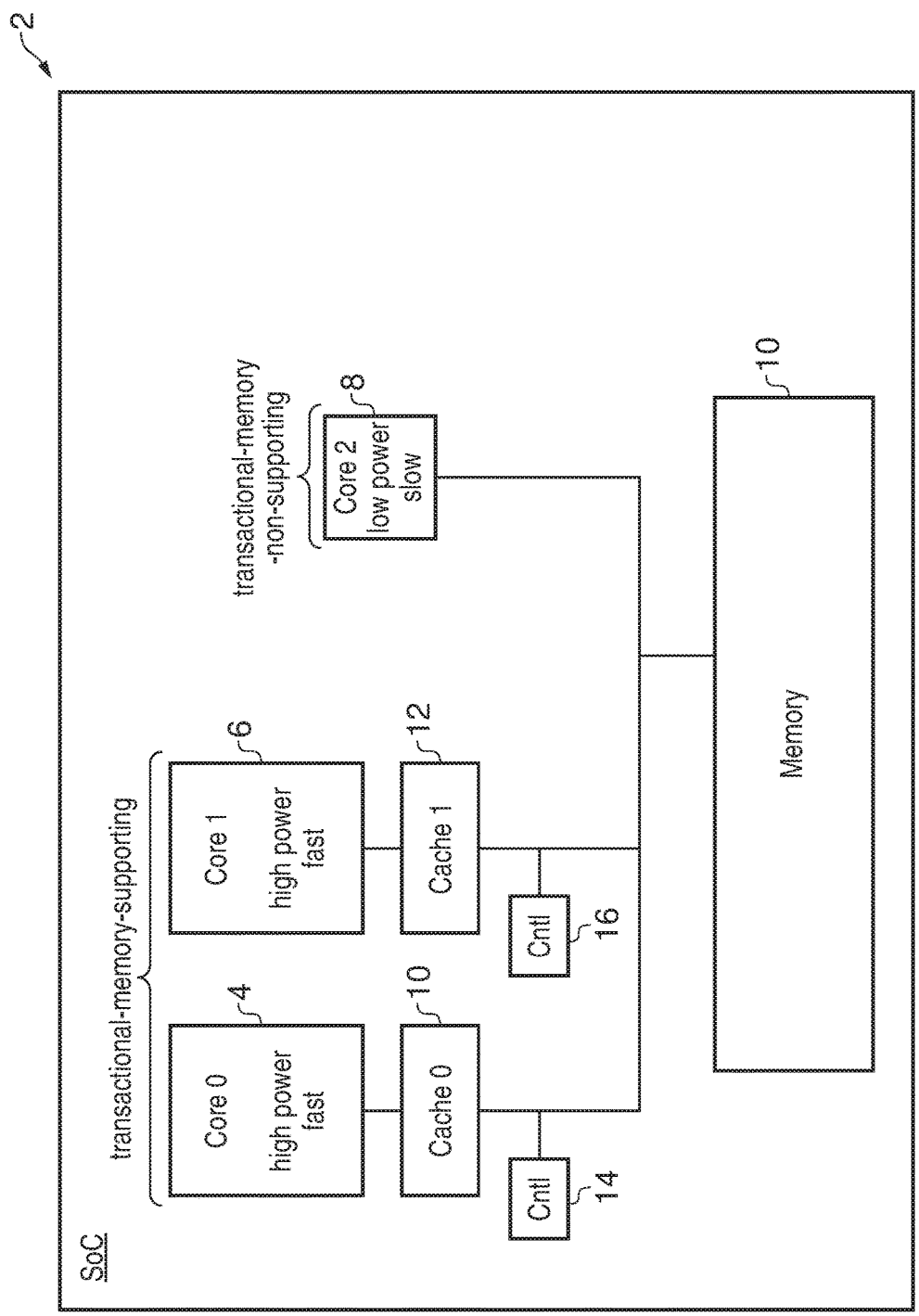

FIG. 1 schematically illustrates a data processing system 2 including a plurality of processing elements 4, 6, 8 which share data values stored within a memory 10. The processing elements 4, 6 are transactional-memory-supporting processing elements in the form of processor cores for executing program instructions and each having associated cache memories 10, 12 and controllers 14, 16 for controlling the sharing of data values in accordance with elision techniques. The processor cores 4, 6 are high performance processor cores which typically consume more energy but have a higher instruction processing throughput than low performance processor cores that consume less energy.

Also included within the data processing system 2 is a transactional-memory-non-supporting processing element 8 in the form of a comparatively low power and slow processor core for executing a stream of processing instructions. This transactional-memory-non-supporting processing element 8 does not include a cache memory or a controller. Accordingly, in order to manage access to shared data values stored within the memory 10, the transactional-memory-non-supporting processing element 8 must rely upon the use of lock values whenever it wishes to obtain exclusive access to data values held within a region of the memory 10.

The data processing system 2 will be seen to be an asymmetric multiprocessor system. The different processor cores 4, 6, 8 each execute a stream of program instructions. These instructions may be from within the same process or from different processes. A given process may be associated with a lock value stored at a lock address within the memory 10. The lock address may be held within one of the architectural registers defining the configuration of a processor core and dedicated to storing the lock address (i.e. a lock address register).

The transactional-memory-supporting processing elements in the form of the processor cores 4, 6 utilise their respective controllers 14, 16 to manage coherency between data values stored within their cache memories 10, 12 and to avoid speculative memory transactions being performed upon shared data values by the respective cores 4, 6 from inappropriately interfering with each other. When one of the processor cores 4, 6 is performing a memory transaction, it holds speculative copies of the data values being read and written within its cache memory 10, 12. If the memory transaction completes, then these data values become non-speculative and can be written back out to the memory 10, or forwarded to another processing element as appropriate. However, if during a memory transaction a request is received to access any of the speculative data values being held locally in association with that memory transaction, then the memory transaction is aborted and the requester for access obtains the rights to access those data values.

Considering transactional memory support in general, a critical section of memory address space is traditionally guarded by a lock; which is a lock value at a given lock address. A transaction (of the transactional memory sort) consists of speculatively maintaining state (memory and registers) such that it can be rolled back on failure. Failure can occur due to various different reasons, but in particular happens due to conflicting accesses to data. In order to detect conflicts transactions maintain a read-set, the addresses read by a processing element (PE) whilst in transactional execution state; and a write-set, the corresponding write addresses whilst in transactional execution state. The values written during a transaction are not visible to other processing elements, they are speculatively stored in the cache. If a PE (say PE0) writes to a line that is in the read-set or write-set of another transaction (on say PE1), the transaction on PE1 will abort. If a transaction (say on PE0) reads a line in another transaction's write-set (on say PE1) then the transaction on PE1 will abort, and PE0 will receive the system-wide non-speculative value for that address (and not the speculative value in PE1's cache). There exist other options, but this requestor wins approach, is typically implemented as it works with existing cache coherence protocols.

When an transaction (of the transactional memory sort) is used to guard a critical section (via the concept referred to as lock elision) it will typically only read the lock address i.e. it does not set the lock value. If the lock is already set, the transaction cannot safely proceed as it must assume a traditional use of the lock, and would, were it to continue, likely race with the owner of the lock.

If the lock is not already set, i.e. it's lock value is in the unlocked state, the process of reading the lock address will be sufficient to ensure mutual exclusion. If another transaction reads enters the same guarded memory region, then the two reads of the lock address are fine, and so long as no "true" data conflicts occur then both transactions can proceed concurrently. Multiple processing elements can speculatively enter a critical section by starting a transaction (of the transactional memory sort). If a processing element enters the critical section non-transactionally, either because it wasn't making forward progress transactionally, or because the processing element doesn't support transactional memory, then it must take (set) the lock in the traditional sense i.e. it must spin until it can get and set the lock.

The process of setting the lock value to a locked state at the lock address, will exclusively requesting the lock address from the other processing elements. Any transactions that have that lock address in their read/write-sets will need to abort.

Returning to the example embodiment of FIG. 1, the transactional-memory-supporting processing elements 4, 6 do not themselves set the lock value associated with a memory region in which they are operating as they utilise their controllers 14, 16 to ensure memory transactions do not interfere with each other. However, in order to provide support for fall back execution mechanisms which may be required should a memory transaction be aborted, or in order to support processing elements which do not have their own controller (e.g. the transactional-memory-non-supporting processing element 8), the controllers 14, 16 monitor access requests to a lock address storing a lock value for the region within the memory 10 for which they are performing a memory transaction and check the lock value is not set before commencing a transaction. If a request is detected to access this lock value, then the controller 14, 16 determines that another processing element is conflicting with the speculative memory transaction and would normally immediately abort the speculative memory transaction and return a response releasing access to the lock address. However, in accordance with the present disclosure, the controllers 14, 16 modify this normal behaviour and instead delay releasing the lock address for exclusive access in response to the received request until a predetermined condition is met.

This delay may permit a pending speculative memory transaction within the processor core 4, 6 concerned to complete thereby reducing the impact of the received request. This is useful in preventing, for example, the low power, low performance transactional-memory-non-supporting processing element 8, which relies upon lock values alone for its shared data values, from unduly interrupting and interfering with the processing performed by the high performance transactional-memory-supporting processing elements 4, 6. The transactional-memory-non-supporting processing element 8 should eventually be allowed to perform its transaction, as otherwise it would be undesirably blocked from making formal progress. However, the present disclosure recognises that it may be inappropriate for the transactional-memory-non-supporting processing element 8 to immediately abort all the other processing activities with which it may conflict.

The predetermined condition which must be met before the release of the lock address for exclusive access in response to the request can take a variety of different forms. These forms may include the request being refused for a predetermined threshold number of times before it is eventually granted. Another form would be that any response at all to the request is delayed for a predetermined threshold period of time. Combinations of these conditions may also be applied as well as other conditions, such as, for example, conditions based upon the identity of the source of the request, e.g. a request received from a transactional-memory-supporting processing element will be immediately responded to with a grant of the request whereas requests from another source which does not support the transactional memory will be subject to additional conditions before it is granted. The predetermined condition is not applied to the gate release of the lock address when the processing element is not executing a memory transaction guarded by that lock address, i.e. in this case the release is independent of the predetermined condition.

Figure 2:
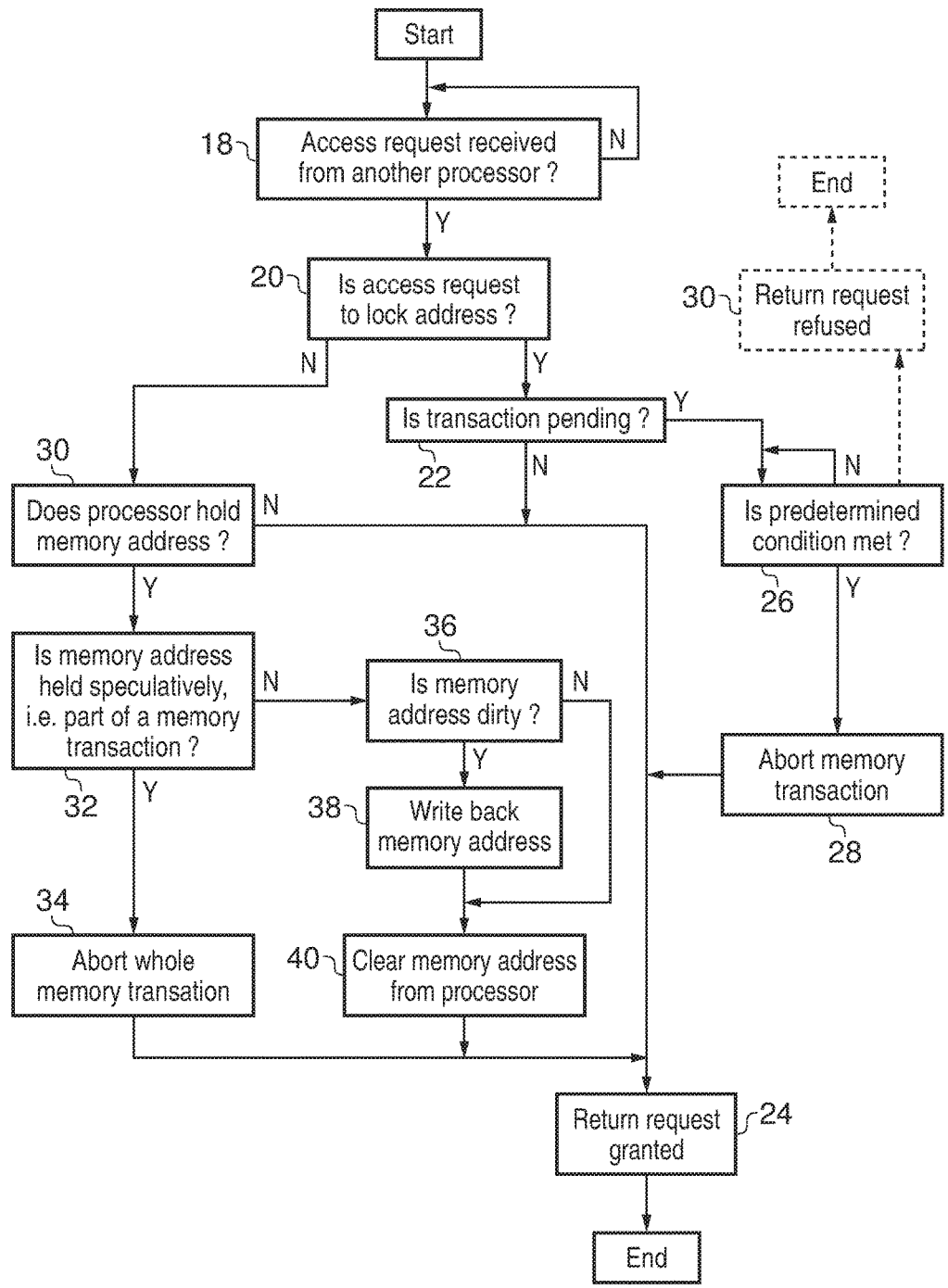
FIG. 2 is a flow-diagram schematically illustrating the behaviour of a controller responding to a request to obtain exclusive access to a lock address received from another processing element.

FIG. 2 is a flow diagram schematically illustrating the action of one of the controllers 14, 16 in response to a access request. Processing waits at step 18 for an access request to be received. When an access request is received, step 20 determines whether the access request is to a lock address. If the access request is to a lock address, then processing proceeds to step 22 where it is determined whether or not there is currently a conflicting/overlapping memory transaction to the same region of memory pending within the processor which has received the request. If there is no transaction pending, then processing may directly proceed to step 24 where the request is granted to the requester such that it is given permission to obtain exclusive access to the lock address at least by the processor which received the request as processed in FIG. 2 (other processor(s) may perform their own similar checks).

If the determination at step 22 is that there is a transaction pending within the processor which received the request, then step 26 serves to determine whether or not a predetermined condition is met before processing proceeds further. In one example embodiment, when the predetermined condition is met, processing proceeds to step 28 where the pending memory transaction is aborted before processing proceeds to step 24. In another example embodiment, as shown in the dashed line boxes in FIG. 2, the predetermined condition may be that the request from this requester has already been refused a certain number of times and if this condition is not met, then a request refused response is returned at step 30 without an abort of the pending memory transaction and instead relying upon the requester to repeat the request if they so wish.

If the result of the determination at step 20 is that the access request is not to a lock address, then processing proceeds to step 30 where a determination is made as to whether or not the processor which received the request is holding the memory address with which the received request is concerned. If the processor does not hold this memory address, then the access request is granted at step 24. If the determination at step 30 is that the processor does hold the memory address concerned, then step 32 determines whether or not that memory address is held speculatively, i.e. as part of a memory transaction as managed by the local controller 14, 16. If the memory address is held speculatively, then the whole pending memory transaction is aborted at step 34 and the access request is granted at step 24. If the memory address is not held speculatively, then step 36 determines whether or not the memory address is dirty, performing a write back if required at step 38, before the memory address is cleared from the processor which received the request at step 40 as the address is to be held exclusively by the requester following return of the grant response at step 24.

Figure 3:
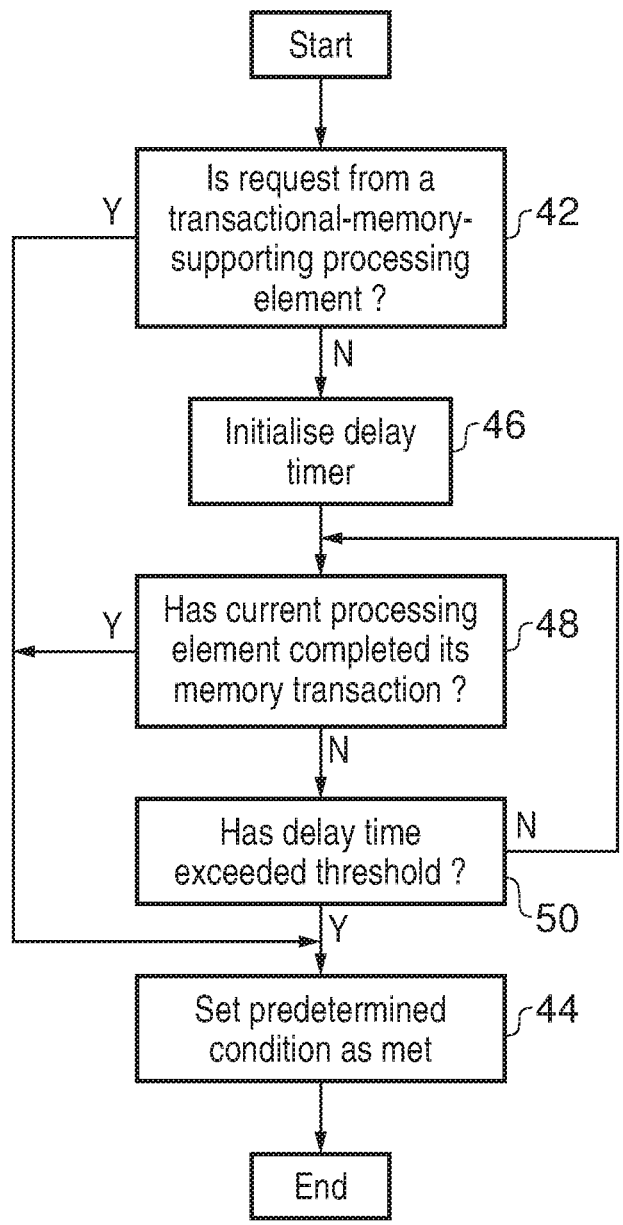
FIG. 3 is a flow diagram illustrating a first form of predetermined condition to be met before a request is granted.

FIG. 3 schematically illustrates one form of a determination as to whether or not the predetermined condition is met. At step 42 a determination is made as to whether or not the request has been received from a transactional-memory-supporting-processing element. If the request has been received from a transactional-memory-supporting processing element (i.e. a peer of the receiver), then processing proceeds directly to step 44 where the condition is set as being met. If the request has not been received from a transactional-memory-supporting processing element, then step 46 initialises a delay timer. Processing then circulates through steps 48 and 50 until either the processing element which received the request has completed its memory transaction or the delay time has exceeded a predetermined threshold since the initialisation at step 46. When either of these condition is met, then the predetermined condition is set as met at step 44.

Figure 4:
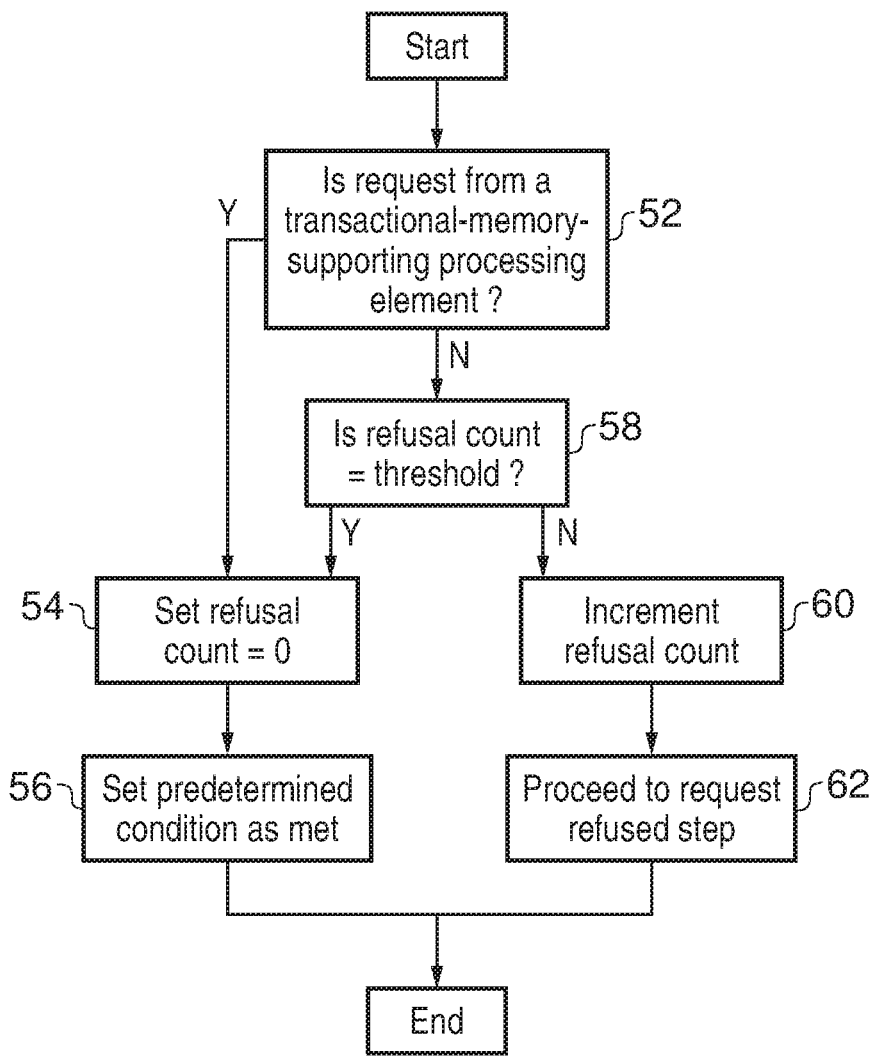
FIG. 4 is a flow diagram illustrating a second example of a predetermined condition to be met before a request is granted.

FIG. 4 provides another example of how the predetermined condition may be set as met. At step 52 a determination is made as to whether the request has been received from a transactional-memory-supporting processing element. If the transaction has been received from such a transactional-memory-supporting processing element, then it will be immediately marked as granted and processing proceeds via step 54 that sets the refusal count to zero and step 56 where the predetermined condition is set as met. If the determination at step 52 request has been received from other than a transactional-memory-supporting processing element, then step 58 determines whether or not the refusal count has yet reached a threshold count. If the refusal count has reached the threshold count, then processing at step 54 sets the refusal count to zero and step 56 sets the predetermined condition as met. However, if the refusal count has yet to reach the threshold count, then processing proceeds to step 60 where the refusal count is incremented and step 62 where a step of proceeding to generating a request refusal is taken. The processing of FIG. 4 serves to refuse a request received from a transactional-memory-non-supporting processing element for a threshold number of times before setting the predetermined condition as being met for such a request and allowing the exclusive access to be obtained.

Figure 5:
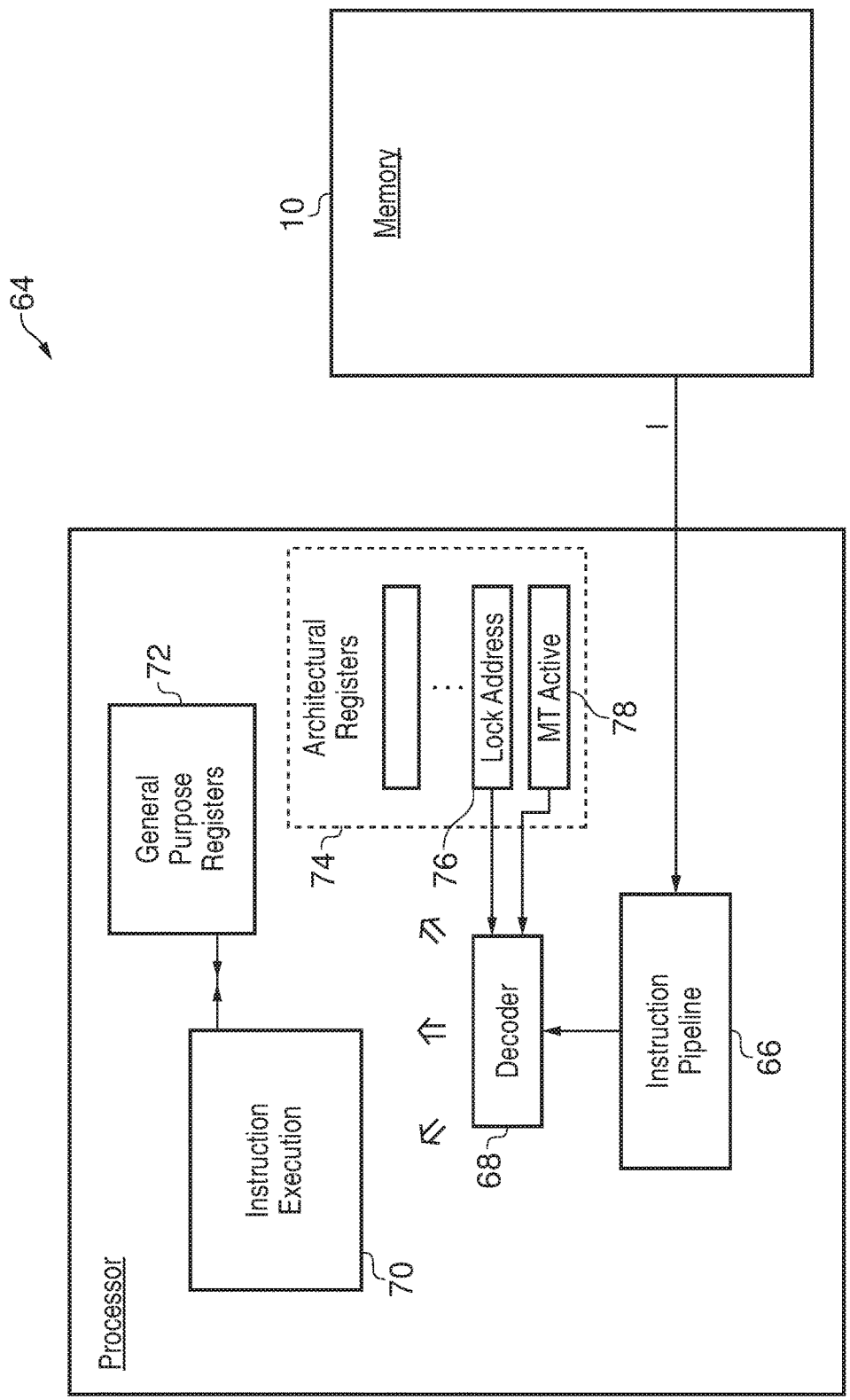
FIG. 5 is a diagram schematically illustrating a data processing system including a lock address register within architectural registers accessed by a transaction start instruction initiating a memory transaction.

FIG. 5 schematically illustrates a data processing system 64 including a processor having an instruction pipeline 66, an instruction decoder 68, instruction execution circuitry 70, a general purpose register bank 72, and a set of architectural registers 74. The data processing apparatus 64 may be one of the transactional-memory-supporting processing elements 4, 6 of FIG. 1. Instructions retrieved to the instruction pipeline 66 pass along the instruction pipeline 66 until they are decoded by the instruction decoder 68. The instruction decoder 68 serves to generate control signals which control the action of the instruction execution circuitry 70 and the other elements within the processor in order to execute the instruction concerned. The instructions executed include a transaction start instruction.

Such a transaction start instruction may be included at the beginning of a sequence of program instructions to be executed which correspond to a memory transaction to be performed. This transaction start instruction is responsible for reading of a lock value from a lock address stored within a lock address register 76 which forms one of the architectural registers 74. This reading need only occur if the processor is not already performing a memory transaction. If the processor is already performing a memory transaction, then the check to determine whether or not the lock value is set will already have been performed and accordingly need not be repeated since the controller 14, 16 will abort the memory transaction using its hardware mechanisms should such a need arise. However, if the processor is not already executing a memory transaction, then the action of the decoder is to execute the transaction start instruction to at least access the lock value stored at the lock address held within the lock address register 76. The status of the processor as to whether or not it is currently executing a memory transaction may be stored within another architectural status register 78 indicating whether or not a memory transaction is currently active within the processor. When a memory transaction is started, the controller 14, 16 will set the value of the architectural status register 78 to indicate this status. The transaction start instruction may also have other actions, such as determining whether or not the lock value is already set and triggering the issuing of requests for exclusive access to that lock value as may be appropriate.

If when the transaction start instructions is decoded by the instruction decoder 68 the determination from the architectural status register 78 is that there is already a memory transaction pending within the processor, then the processing of instructions from the instruction stream is allowed to proceed further without an access having to be made to the lock values stored at the lock address since an assumption can be made that these checks will already have been done by the transaction start instruction which started the memory transaction which is already pending.

The lock address stored by the lock address register 76 may be associated with a given program process being executed by the processor at the current time. When this process changes, then the lock address stored within the lock address register 76 may be changed appropriately. Accordingly, the lock addresses held by different processors will match when the are executing the same program process, which will often be the case when they are sharing data values within the memory 10.

Figure 6:
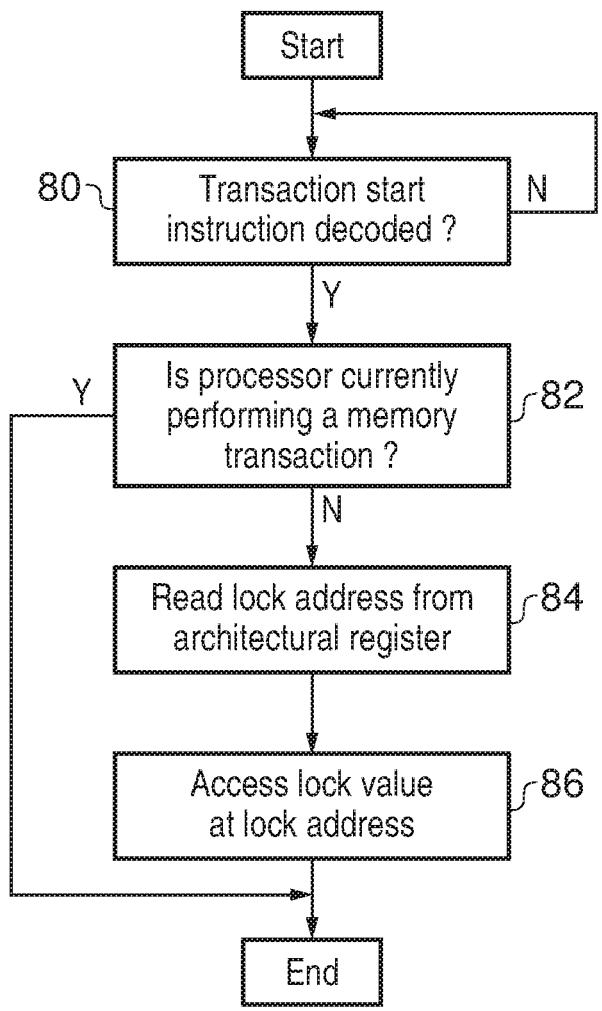
FIG. 6 is a flow diagram schematically illustrating processing of a transaction start instruction.

FIG. 6 is a flow diagram illustrating the action of the instruction decoder 68 in decoding a transaction start instruction. At step 80 processing waits until a transaction start instruction is decoded. At step 82 a determination is made as to whether or not the processor is currently performing a memory transaction. This may be achieved by reading the value from the architectural status register 78 within the architectural register 74. If the processor is currently performing a memory transaction, then at least this aspect of the execution of the transaction start instruction may be considered as complete and the processing terminated.

If the determination at step 82 is that the processor is not currently performing a memory transaction, then step 84 serves to read the lock address from the lock address register 76. Step 86 then accesses the lock value stored at the address which has been read from the lock address register 76. This access of the lock value may, in some embodiments, serve to set the lock value, or at least notify other processors who have been monitoring access to that lock address of the action of the processor which has executed the transaction start instruction. Storing of the lock address within an architectural register on a per process basis permits a more efficient lookup of a lock value to be achieved and also permits the suppression of processing effort in performing such a lookup if the processor concerned is already performing a memory transaction based upon the assumption that the lookup has already been performed. This may be the case, for example, where nested memory transactions are performed and repeated accesses to the lock value are not required since the processor is a transactional-memory-supporting processing element and its controller 14, 16 will be responsible for managing conflicts between memory transactions should they arise.

The invention claimed is:

1. Apparatus for processing data and using hardware support for atomic memory transactions, said apparatus comprising:
   a plurality of processors, each configured to execute a sequence of program instructions; and
   a memory configured to store data values shared by said plurality of processors;
   wherein at least one of said plurality of processors is an transactional-memory-supporting processor having a controller configured to monitor access to a lock address within said memory and said controller is configured to respond to a received request from another of said plurality of processors to obtain exclusive access to said lock address by:
   (i) when said transactional-memory-supporting processor is executing a memory transaction guarded by said lock address, delaying releasing said lock address for exclusive access until a predetermined condition is met; and
   (ii) when said transactional-memory-supporting processor is not executing a memory transaction guarded by said lock address, releasing said lock address for exclusive access independent of said predetermined condition.

2. Apparatus as claimed in claim 1, wherein said controller is configured to delay releasing said lock address by returning a request refused response to said received request.

3. Apparatus as claimed in claim 1, wherein said controller is configured to delay releasing said lock address by delaying returning any response to said received request.

4. Apparatus as claimed in claim 1, wherein said predetermined condition is at least partially that said transactional-memory-supporting processor has received a predetermined number of access requests to said lock address without releasing said lock address.

5. Apparatus as claimed in claim 1, wherein said predetermined condition is at least partially that said transactional-memory-supporting processor has delayed releasing said lock address for a predetermined time.

6. Apparatus as claimed in claim 1, wherein said controller is configured to abort said memory transaction guarded by said lock value if said lock address is released before said memory transaction has completed.

7. Apparatus as claimed in claim 1, wherein said plurality of processors includes at least one transactional-memory-non-supporting processor without said controller.

8. Apparatus as claimed in claim 7, wherein said transactional-memory-non-supporting processor is configured to execute a sequence of lock acquisition program instructions before commencing execution of a memory transaction guarded by said lock value.

9. Apparatus as claimed in claim 7, wherein said transactional-memory-non-supporting processor has a lower power consumption and a lower instruction processing performance than said transactional-memory-supporting processor.

10. Apparatus as claimed in claim 1, wherein said plurality of processors form an asymmetric multiprocessing apparatus.

11. Apparatus as claimed in claim 1, comprising a plurality of transactional-memory-supporting processors.

12. Apparatus as claimed in claim 11, wherein said predetermined condition is met if said received request is received from one of said plurality of transactional-memory-supporting processors.

13. Apparatus as claimed in claim 1, wherein at least one of said plurality of processors comprises:
one or more architectural registers configured to hold parameters specifying configuration of said at least one of said plurality of processors, said one or more architectural registers including a lock address register dedicated to storing said lock address; and
instruction decoder circuitry configured to decode a transaction start instruction indicating starting of a memory transaction and:
(i) if said at least one of said plurality of processors is not executing a memory transaction, then to generate one or more control signals to control reading of said lock address from said lock address register and at least accessing of said lock value stored at said lock address; and
(ii) if said at least one of said plurality of processors is already executing a memory transaction, then proceeding with further processing without accessing of said lock value stored at said lock address.

14. Apparatus as claimed in claim 13, wherein said apparatus is configured to execute program instructions corresponding to a plurality of different program processes with a given one of said plurality of processors executing a given one of said plurality of program processes for a given period and said lock address register of said given one of said plurality of processors storing a lock address for said given one of said plurality of program processes during said given period.

15. Apparatus for processing data and including hardware support for atomic memory transactions, said apparatus comprising:
a plurality of means for processing, each for executing a sequence of program instructions; and
means for storing data values shared by said plurality of means for processing;
wherein at least one of said plurality of means for processing is an transactional-memory-supporting processor having means for monitoring access to a lock address within said means for storing and for responding to a received request from another of said plurality of means for processing to obtain exclusive access to said lock address by:
(i) when said transactional-memory-supporting processor is executing a memory transaction guarded by said lock address, delaying releasing said lock address for exclusive access until a predetermined condition is met; and
(ii) when said transactional-memory-supporting processor is not executing a memory transaction guarded by said lock address, releasing said lock address for exclusive access independent of said predetermined condition.

16. A method of processing data using hardware support for atomic memory transactions, said method comprising the steps of:
executing a sequence of program instructions using a plurality of processors; and
storing within a memory data values shared by said plurality of processors;
wherein at least one of said plurality of processing means is an transactional-memory-supporting processor that monitors access to a lock address within said memory and responds to a received request from another of said plurality of processors to obtain exclusive access to said lock address by:
(i) when said transactional-memory-supporting processor is executing a memory transaction guarded by said lock address, delaying releasing said lock address for exclusive access until a predetermined condition is met; and
(ii) when said transactional-memory-supporting processor is not executing a memory transaction guarded by said lock address, releasing said lock address for exclusive access independent of said predetermined condition.

17. Apparatus for processing data and providing hardware support for atomic memory transactions, said apparatus comprising:
a plurality of processors, each configured to execute a sequence of program instructions; and
a memory configured to store data values shared by said plurality of processors; wherein
at least a given one of said plurality of processors comprises:
one or more architectural registers configured to hold parameters specifying configuration of said at least one of said plurality of processors, said one or more architectural registers including a lock address register dedicated to storing a lock address serving to control exclusive access to a region of said memory; and
instruction decoder circuitry configured to decode a transaction start instruction indicating starting of a memory transaction and:
(i) if said given one of said plurality of processors is not executing a memory transaction, then to generate one or more control signals to control reading of said lock address from said lock address register; and
(ii) if said given one of said plurality of processors is already executing a memory transaction, then proceeding with further processing without reading said lock address from said lock address register.

18. Apparatus as claimed in claim 17, wherein said apparatus is configured to execute program instructions corresponding to a plurality of different program processes with a given one of said plurality of processors executing a given one of said plurality of program processes for a given period and said lock address register of said given one of said plurality of processors storing a lock address for said given one of said plurality of program processes during said given period.

19. Apparatus for processing data and providing hardware support for atomic memory transactions, said apparatus comprising:
a plurality of means for processing, each for executing a sequence of program instructions; and a memory for storing data values shared by said plurality of means for processing; wherein at least a given one of said plurality of means for processing comprises:

one or more means for holding parameters specifying configuration of said at least one of said plurality of processing means, said one or more means for holding including lock means dedicated for storing a lock address serving to control exclusive access to a region of said memory; and means for decoding a transaction start instruction indicating starting of a memory transaction and:
  (i) if said given one of said plurality of means for processing is not executing a memory transaction, then to generate one or more control signals to control reading of said lock address from said means for holding; and
  (ii) if said given one of said plurality of means for processing means is already executing a memory transaction, then proceeding with further processing without reading said lock address from said means for holding.

20. A method of processing data using hardware support for atomic memory transactions, said method comprising the steps of:

executing a sequence of program instructions using a plurality of processors; and storing within a memory data values shared by said plurality of processors; wherein a given one of said plurality of processors performs the steps of:

holding within one or more architectural registers parameters specifying configuration of said at least one of said plurality of processors, said one or more architectural registers including a lock address register dedicated to storing a lock address serving to control exclusive access to a region of said memory; and decoding a transaction start instruction indicating starting of a memory transaction and:
  (i) if said given one of said plurality of processors is not executing a memory transaction, then generating one or more control signals to control reading of said lock address from said lock address register; and
  (ii) if said given one of said plurality of processors is already executing a memory transaction, then proceeding with further processing without reading said lock address from said lock address register.

* * * * *